Patented Feb. 12, 1929.

1,702,002

UNITED STATES PATENT OFFICE.

HEINRICH GREUNE, OF HOCHST-ON-THE-MAIN, GERMANY, ASSIGNOR TO GRASSELLI DYESTUFF CORPORATION, OF NEW YORK, N. Y., A CORPORATION OF DELAWARE.

CYCLIC KETONIC COMPOUND AND PROCESS OF MAKING IT.

No Drawing. Application filed June 16, 1927, Serial No. 199,422, and in Germany June 24, 1926.

The present invention relates to new cyclic ketonic compounds and to a process of preparing the same.

I have found that by causing maleic anhydride to act upon an aromatic hydrocarbon having an unsubstituted peri-position as represented by the general formula:

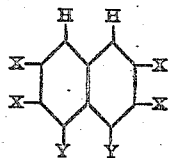

in which X stands for hydrogen or a monovalent substituent and the two Y's stand for hydrogen or jointly for the group

in the presence of an acid condensing agent new condensation products are obtained showing the characteristics of cyclic ketones.

In the course of the reaction, which obviously occurs in two stages, there is probably at first formed a carboxylic acid with an open chain changing into the ring ketone during the further condensation. Thus when operating for instance in presence of a low-boiling solvent such as carbon disulfide, generally at temperatures up to the boiling point of carbon disulfide, only the carboxylic acid is obtained which can be easily transformed into the corresponding ring ketone by further condensing it at a raised temperature, for instance with molten sodium-aluminium chloride. It is, of course, also possible to produce the ring ketone by a single operation, for instance by fusing the hydrocarbon in question with maleic anhydride in presence of sodium-aluminium chloride.

Whereas the carboxylic acids usually dissolve in strong sulfuric acid to a yellowish-red to blood-red solution and without any fluorescence, the solutions of the ring ketones in sulfuric acid, which for the most part are of a faintly yellow coloration, show a pronounced moss-green fluorescence.

The said new ring ketones are valuable intermediate products and are intended to be used as starting materials in the production of dyestuffs.

The following examples illustrate my invention, but they are not intended to limit it thereto; the parts are by weight:

(1) Into a solution of 26 parts of naphthalene and 22 parts of maleic anhydride in 150 parts of nitrobenzene are introduced by portions at a temperature below 15° C. 30 parts of aluminium chloride, and this mixture is further stirred until the evolution of hydrochloric acid is finished. The whole is then poured into 2000 parts of water, the nitrobenzene is distilled off by means of water vapor and the resulting condensation product is filtered by suction. In order to purify the same, it is dissolved in dilute sodium carbonate, the solution is filtered and the product is reprecipitated from the filtrate by means of dilute hydrochloric acid. It constitutes a yellow carboxylic acid dissolving in concentrated sulfuric acid to an orange-red solution. When recrystallized from benzene, it melts at 139° C. to 140° C.

The said carboxylic acid can be fused with sodium-aluminium chloride to form the corresponding ring ketone by heating 15 parts of the acid with 100 parts of sodium-aluminium chloride to about 120° C. to 140° C. until the formation of the ring ketone is complete. For working up the product, the melt is decomposed with much water, the mass is filtered by suction and the residue washed first with hot dilute hydrochloric acid and then with water. In order to purify the residue, it is dissolved in sodium carbonate, the mass is filtered, the finished ring ketone, is precipitated from the filtrate by means of dilute hydrochloric acid and is thus obtained in the form of a carboxylic acid. This acid crystallizes from dilute alcohol in the shape of colorless leaflets melting at 186° C. to 187° C. It dissolves in strong sulfuric acid to a faintly yellow solution with an intense moss-green fluorescence.

(2) Into 480 parts of molten sodium-aluminium chloride is introduced by portions at a temperature of about 120° C. to 140° C. a powdered mixture of 26 parts of naphthalene and 22 parts of maleic anhydride, and the molten mass is maintained at this temperature until the condensation to the ring ketone is complete. The ring ketone which is immediately formed when operating as above indicated, is worked up and purified in the manner described in Example (1). Recrystallized from dilute alcohol, it melts at 186° C. to 187° C. It is identical with the cyclic ketocarboxylic acid obtainable according to Example (1).

(3) Into a solution, heated to boiling, of 30,8 parts of acenaphthene and 22 parts of maleic anhydride in 150 parts of carbon disulfide are introduced by and by 30 parts of aluminium chloride, and after the whole of the aluminium chloride has been added, the mass is further heated to boiling in a reflux apparatus for about 3 hours. The condensation product formed is worked up and purified as indicated in Example (1). A carboxylic acid is finally obtained, having obviously an open chain; recrystallized from dilute alcohol it forms yellowish leaflets, melting at 154° C. to 155° C. and dissolving in concentrated sulfuric acid to a blood-red solution.

By melting this acid with about seven times its quantity of sodium-aluminium chloride under the conditions stated in Example (1) and working up and purifying the resulting product in the manner indicated in the said example, the corresponding ring ketone is produced in the form of a carboxylic acid, crystallizing from dilute alcohol in the shape of almost colorless needles, melting at 216° C. to 217° C. and dissolving in concentrated sulfuric acid to a yellow solution with an intense moss-green fluorescence. It is identical with the ring ketocarboxylic acid obtainable according to Example (4).

(4) Into 200 parts of molten sodium-aluminium chloride is introduced by portions at about 120° C. to 130° C. a powdered mixture of 154 parts of acenaphthene and 110 parts of maleic anhydride, and the molten mass is maintained at the temperature until the formation of the ring ketone is complete. The condensation product can be worked up and purified as indicated in Example (2). Thus a ring ketocarboxylic acid is obtained, which when crystallized from dilute alcohol forms almost colorless needles, melting at 216° C. to 217° C. and dissolving in concentrated sulfuric acid to a yellow solution with an intense moss-green fluorescence.

In the same manner as naphthalene and acenaphthene themselves, also derivatives thereof having a free peri-position, as for instance 1-methylnaphthalene or alpha- and beta-naphthol or the like, can be converted into the corresponding ring ketones by the action of maleic anhydride with the aid of aluminium chloride or ferric chloride. Other hydrocarbons and the derivatives thereof having a free peri position, as for instance anthracene, behave in exactly the same manner.

In the following claims the term "aromatic hydrocarbons having an unsubstituted peri-position" is understood to comprise also derivatives or substitution products thereof.

I claim:

1. The process which comprises causing maleic anhydride to act upon an aromatic hydrocarbon having an unsubstituted peri-position in the presence of an acid condensing agent and a solvent at a temperature up to the boiling point of carbon disulfide.

2. The process which comprises causing maleic anhydride to act upon an aromatic hydrocarbon having an unsubstituted peri-position in the presence of aluminum chloride and a solvent at a temperature up to the boiling point of carbon disulfide.

3. The process which comprises heating to boiling a mixture of maleic anhydride, an aromatic hydrocarbon having an unsubstituted peri-position and carbon disulfide in the presence of aluminum chloride.

4. The process which comprises causing maleic anhydride to act upon an aromatic hydrocarbon having an unsubstituted peri-position in the presence of an acid condensing agent and a solvent at a temperature up to the boiling point of carbon disulfide, and fusing the intermediate product thus obtainable with sodium aluminum chloride.

5. The process which comprises causing maleic anhydride to act upon an aromatic hydrocarbon having an unsubstituted peri-position in the presence of aluminum chloride and a solvent at a temperature up to the boiling point of carbon disulfide, and fusing the intermediate product thus obtainable with sodium aluminum chloride.

6. The process which comprises heating to boiling a mixture of maleic anhydride, an aromatic hydrocarbon having an unsubstituted peri-position and carbon disulfide in the presence of aluminum chloride and fusing the intermediate product thus obtainable with sodium aluminum chloride at a temperature of about 120 to 140° C.

7. The process which comprises causing maleic anhydride to act upon a compound of the general formula:

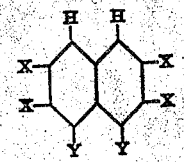

wherein X stands for hydrogen or a monovalent substituent and the two Y's stand for hydrogen atoms or jointly for the group

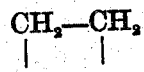

in the presence of an acid condensing agent and a solvent at a temperature up to the boiling point of carbon disulfide, and fusing the intermediate product thus obtainable with sodium aluminum chloride.

8. The process which comprises causing maleic anhydride to act upon a compound of the general formula:

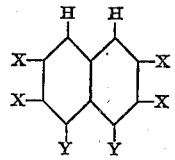

wherein X stands for hydrogen or a monovalent substituent and the two Y's stand for hydrogen atoms or jointly for the group

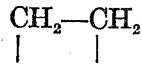

in the presence of aluminum chloride and a solvent at a temperature up to the boiling point of carbon disulfide and fusing the intermediate product thus obtainable with sodium aluminum chloride.

9. The process which comprises heating to boiling a mixture of maleic anhydride, a compound of the general formula:

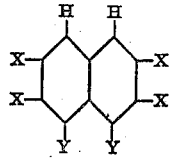

wherein X stands for hydrogen or a monovalent substituent and the two Y's stand for hydrogen atoms or jointly for the group

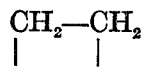

and carbon-disulfide in the presence of aluminum chloride and fusing the intermediate product thus obtainable with sodium aluminum chloride at a temperature of about 120 to 140° C.

10. The process which comprises causing maleic anhydride to act upon naphthalene in the presence of an acid condensing agent and a solvent at a temperature up to the boiling point of carbon disulfide, and fusing the intermediate product thus obtainable with sodium aluminum chloride.

11. The process which comprises causing maleic anhydride to act upon naphthalene in the presence of aluminum chloride and a solvent at a temperature up to the boiling point of carbon disulfide, and fusing the intermediate product thus obtainable with sodium aluminum chloride.

12. The process which comprises heating to boiling a mixture of maleic anhydride, naphthalene and carbon disulfide in the presence of aluminum chloride and fusing the intermediate product thus obtainable with sodium aluminum chloride at a temperature of about 120 to 140° C.

13. As a new product, a compound showing the characteristics of cyclic ketones being soluble in concentrated sulfuric acid to a yellow solution with an intense moss-green fluorescence and being obtainable by causing maleic anhydride to act upon an aromatic hydrocarbon having an unsubstituted peri-position in the presence of an acid condensing agent.

14. As a new product, a compound showing the characteristics of cyclic ketones being soluble in concentrated sulfuric acid to a yellow solution with an intense moss-green fluorescence and being obtainable by causing maleic anhydride to act upon a compound of the general formula:

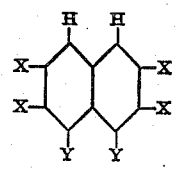

wherein X stands for hydrogen or a monovalent substituent and the two Y's stand for hydrogen atoms or jointly for the group

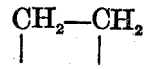

in the presence of an acid condensing agent.

15. As a new compound, the condensation product of maleic anhydride with naphthalene which, when recrystallized from diluted alcohol, forms colorless leaflets melting at 186° C. to 187° C. being soluble in strong sulfuric acid to a faintly yellow solution with an intense moss-green fluorescence and showing the characteristic of cyclic ketones.

In testimony whereof, I affix my signature.

HEINRICH GREUNE.